United States Patent [19]
Kang et al.

[11] Patent Number: 5,257,117
[45] Date of Patent: Oct. 26, 1993

[54] COMPUTER-FACSIMILE SYSTEM HAVING SEPARATELY A SENDING DEVICE AND A RECEIVING DEVICE

[75] Inventors: Seung I. Kang, Gangnam; Joon W. Lee, Songpa; Yong W. Kim, Migum, all of Rep. of Korea

[73] Assignee: Sindo Ricoh Co., Ltd., Seoul, Rep. of Korea

[21] Appl. No.: 778,465

[22] Filed: Oct. 15, 1991

[30] Foreign Application Priority Data
Oct. 15, 1990 [KR] Rep. of Korea ............... 1990-16398

[51] Int. Cl.$^5$ ............................................. H04N 1/32
[52] U.S. Cl. ............................ 358/468; 358/442; 379/100
[58] Field of Search .............. 358/468, 469, 442; 379/100; 364/514

[56] References Cited
U.S. PATENT DOCUMENTS

| | | | |
|---|---|---|---|
| 4,652,933 | 3/1987 | Koshiishi | 358/469 |
| 4,996,707 | 2/1991 | O'Malley et al. | 379/100 |
| 5,021,892 | 6/1991 | Kita et al. | 358/468 |

Primary Examiner—Edward L. Coles, Sr.
Assistant Examiner—Jill Jackson
Attorney, Agent, or Firm—Darby & Darby

[57] ABSTRACT

A computer-facsimile system having separately a sending device and a receiving device, which devices are connected to the computer through a connecting device. Accordingly, the computer-facsimile system comprises a sending device of the facsimile system, a receiving device, and a connecting device connected to the sending device, the receiving device and the computer.

2 Claims, 8 Drawing Sheets

COMPUTER-FACSIMILE SYSTEM HAVING SEPARATELY A SENDING DEVICE AND A RECEIVING DEVICE

BACKGROUND OF THE INVENTION

The present invention relates to a computer-facsimile system combining the computer and the facsimile system, and more particularly to a computer-facsimile system having separately a sending device and a receiving device.

The prior art computer-facsimile system is composed of the sending and receiving device in one body. This system, however, had a problem requiring the purchase of unnecessary addition in the user using just the sending device or just the receiving device. For example, the functions of the image input device and the facsimile sending device can be performed by just the facsimile sending device, the computer, and the connecting device, and the functions of the facsimile receiving device and the computer storing the received data can be performed by just the facsimile receiving device, the computer, and the connecting device.

SUMMARY OF THE INVENTION

It is an object of this invention to provide a computer-facsimile system having separately a sending device and a receiving device, which the devices are connected to the computer through the connecting device.

An object of the invention is to provide a computer-facsimile system having separately a sending device and a receiving device, which devices are connected to the computer through a connecting device. Accordingly, the computer-facsimile system comprises a sending device of the facsimile system, a receiving device, and a connecting device connected to the sending device, the receiving device and the computer.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
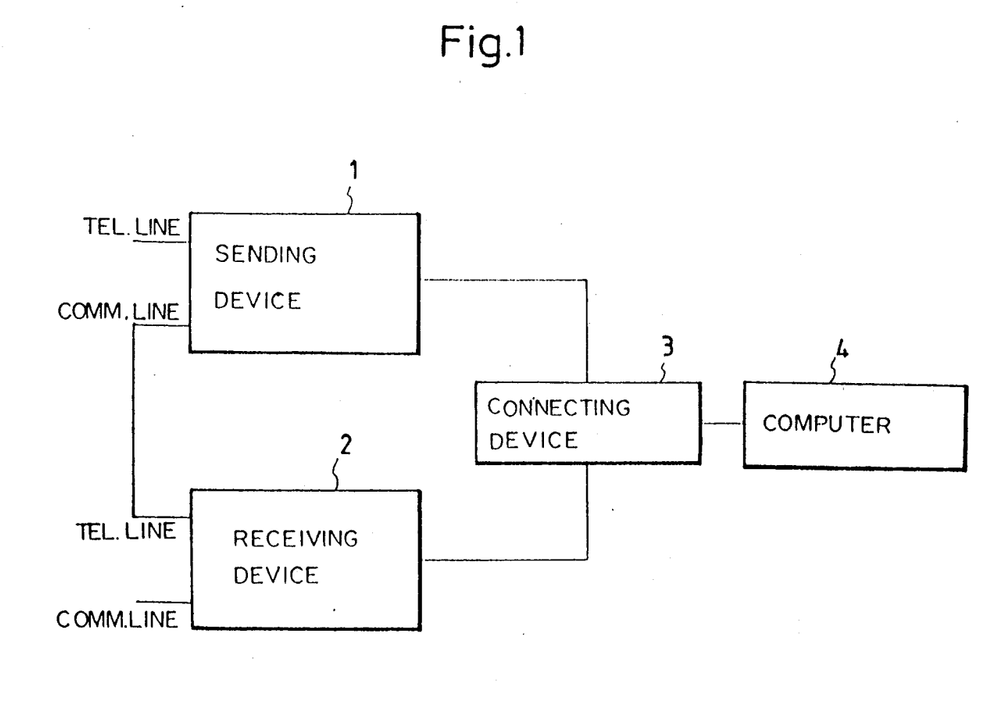
FIG. 1 is an overall view for explaining the invention.

FIG. 1 is an overall view of the invention, and in FIG. 1, the reference number 1 shows a sending device, 2 a receiving device, 3 a connecting device of facsimile system and computer, and 4 a computer, respectively.

In case that the data are transmitted to the other party's facsimile device, the sending device, reads the document, and the receiving device 2 transmits the data through the communication line. And in case that the data are received from the other party's facsimile device, the received data are recorded at the recorder of the receiving device, or the data are stored at the computer 4 through the connecting device 3. The data stored at the computer 4 are sent to the receiving device 2 through the connecting device 3, and then the data are outputted through the recorder, or are transmitted through the communication line. In case of copying the document, the sending device 1 reads the document, and outputs the read data to the receiving device 2.

Figure 2:
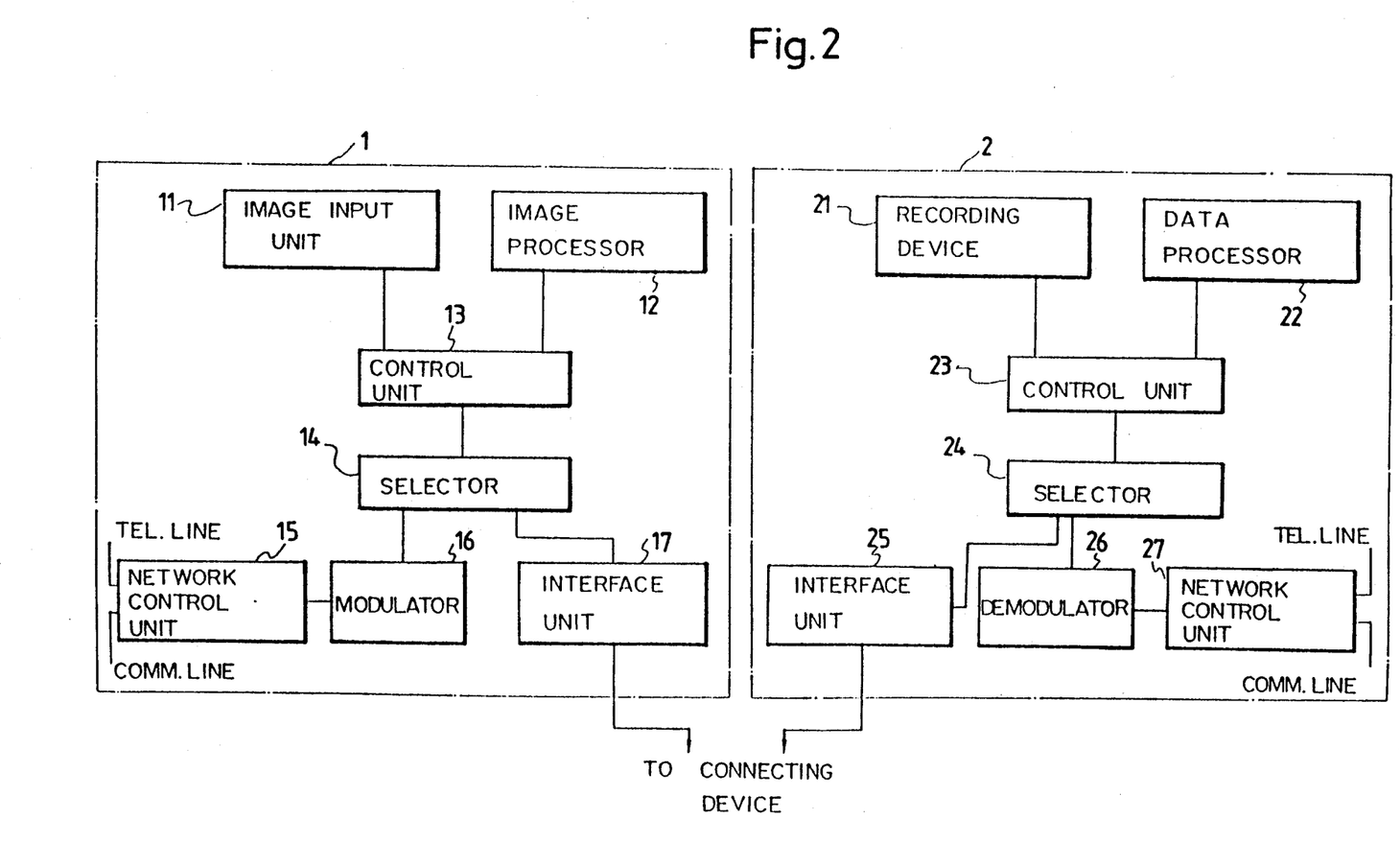
FIG. 2 is a construction diagram of the sending device and the receiving device of the invention.

FIG. 2 is a construction diagram of the sending device and the receiving device of the invention, and in FIG. 2, the reference number 1 shows a sending device, 11 an image input unit, 12 an image processor, 13 a sending device control unit, 14 a sending device selecting unit, 15 a network control unit, 16 a modulator, 17 a sending interface unit, 2 a receiving device, 21 a recording device, 22 a data processor, 23 a receiving device control unit, 24 a receiving device selector, 25 a receiving interface unit, 26 a demodulator, and 27 a receiving device network control unit, respectively.

The image processor 12 performs compression and coding of the document data inputted through the image input unit 11. The sending device control unit 13 decides that transmits the data encoded at the image processor 12 to the network control unit or that transmits the encoded data to the sending interface unit 17, and the sending device selecting unit 14 selects the data path according to the decision. Here, the sending device control unit 13 and the sending device selecting unit 14 can be composed of a single IC chip having a CPU function. In case of the facsimile transmission, the modulator 16 modulates the data, and then transmits the data to the communication line through the network control unit 15. The receiving device 2 and external devices to transmit and copy the data via the sending interface unit 17 can be connected to the sending interface unit 17.

The receiving device 2 receive the transmitted data from the other party's facsimile through the receiving device network control unit 27, or receive the data from the sending device 1 connected to the data from the sending device 1 connected to the receiving interface units 25 or from other data input devices.

That is, in case that the data are inputted through the communication line, the demodulator 26 is selected by the receiving device selector 24 and demodulates the data via the receiving device network control unit 27, the data processor regenerates the data into the original data, and then the regenerated data are recorded at the recording device 21. Here, the receiving device control unit 23 and the receiving device selector 24 can be composed of a single IC chip having a CPU function.

On the other hand, in case that the data are inputted through the receiving interface unit 25 is selected by the receiving device selector 24, and the data are processed by the same way as the above data process.

Figure 3:
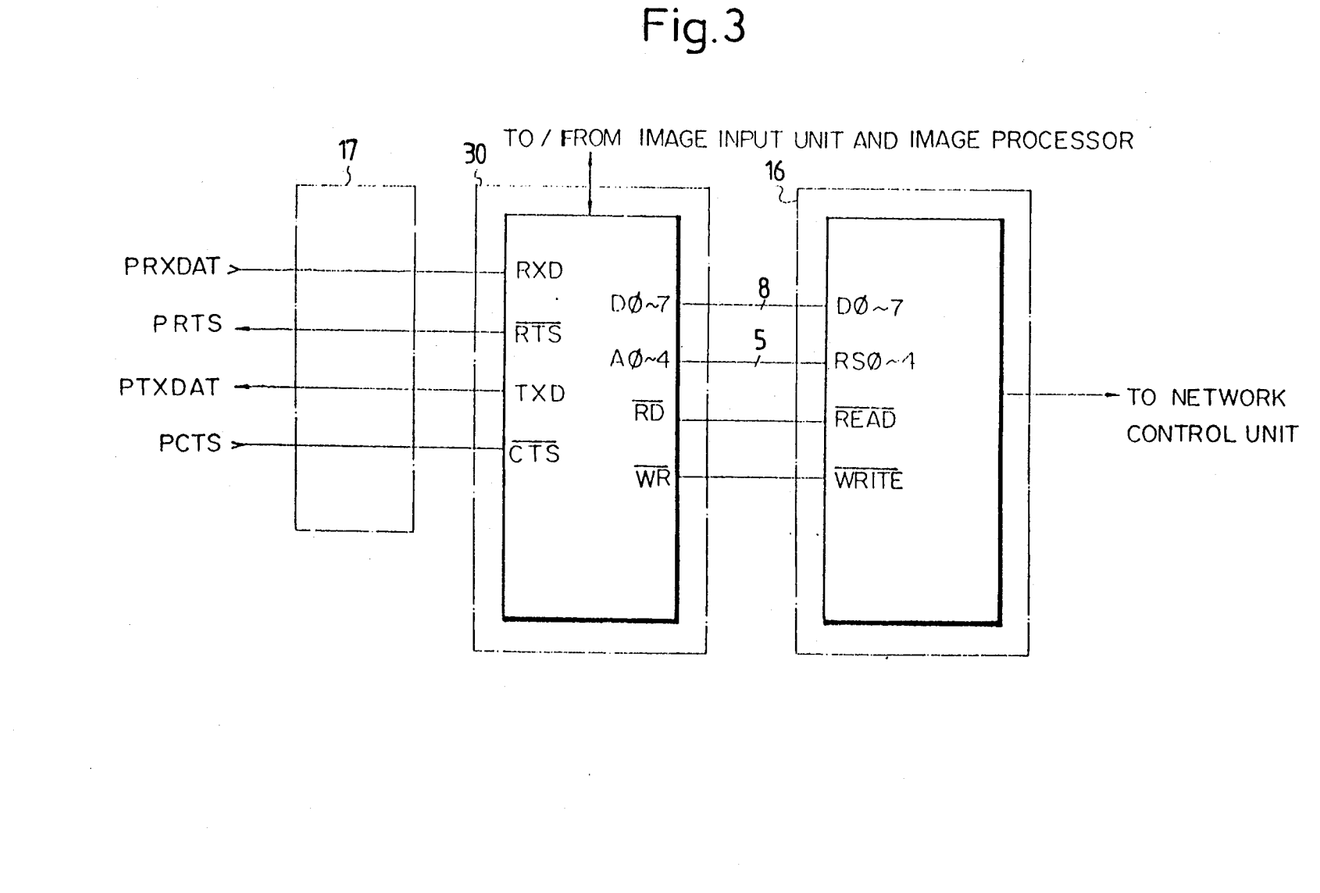
FIG. 3 is a schematic view for the sending device control unit and the sending device selector, the modulator, and the sending interface unit.

FIG. 3 is a schematic view for the sending device control unit and the sending device selector, the modulator, and the sending interface unit, and in FIG. 3, the reference number 30 shows a CPU chip performing functions of the sending device control unit 13 and the sending device selector 14.

In case that the modulator 16 is selected through the address lines A0 through A4 by the control of the CPU chip 30, the data are transmitted to the other party's facsimile device through the communication line, and in case that TXD signal line is selected, the data are transmitted to the receiving device or the external devices connected to the PTXDAT line, and then it performs the general copy function or the data are transmitted to the external devices, for example, the personal computer.

The line symbol PRXDAT shown in the drawing shows the data receiving line, PRTS the data request line to send, PTXDAT the data sending line, and PCTS the data sending command line, respectively.

Figure 4:
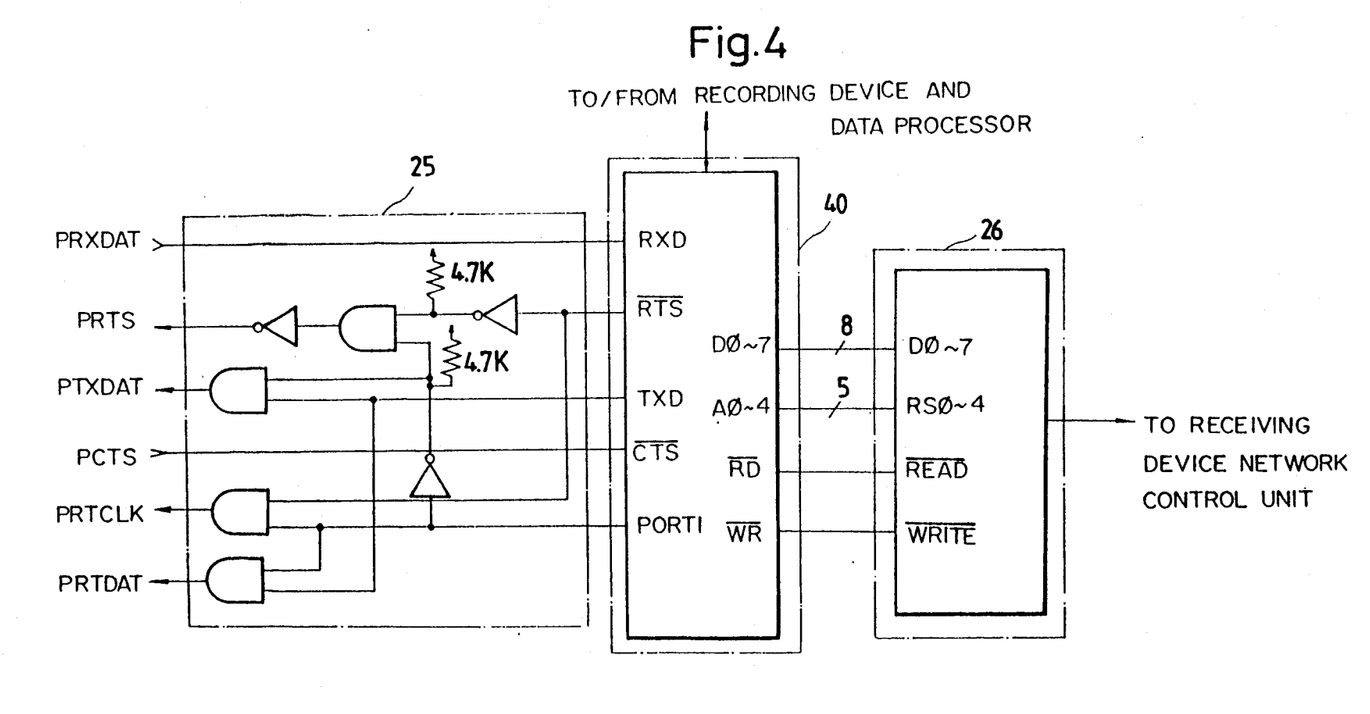
FIG. 4 is a schematic view for the receiving device control unit and the receiving device selector, the receiving interface unit, and the demodulator.

FIG. 4 is a schematic view for the receiving device control unit and the receiving device selector, the receiving interface unit, and the demodulator, and in FIG. 4, the reference number 40 shows a CPU chip performing functions of the receiving device control unit 23 and the receiving device selector 24.

If the port 1 of the CPU chip 40 is turned to a high level, the signal line (PRTCLK) and the signal line (PRTDAT) are selected, and then the data synchronized at the clock signal of the signal line (PRTCLK) are outputted through the signal line (PRTDAT). Reversely, if the port 1 of the CPU chip 40 is turned to a low level, the signal line (PTXDAT) is selected, and then the data are outputted through the signal line (PTXDAT).

That is, if the port 1 is in the active state, the data are transmitted to the recorder (or the thermal printer) through the signal line (PTXDAT) is selected, and then the data are transmitted to the external devices connected to the receiving interface unit 25, for example, to the personal computer.

On the other hand, in case of receiving the facsimile information from the remote facsimile device, the demodulator 26 is selected by the address lines A0 through A4 of the CPU chip 40, the data received through the communication line are recorded through the terminals D0 through D7 of the CPU chip 40 and the signal line (PRTDAT) of the receiving interface unit 25.

The line symbol PRXDAT shows the data receiving line, PRTS the request line to receive, PRXDAT the data sending line, PCTS the data receiving command line, PRTCLK the clock signal line, and PRTDAT the recording data line, respectively.

Figure 5:
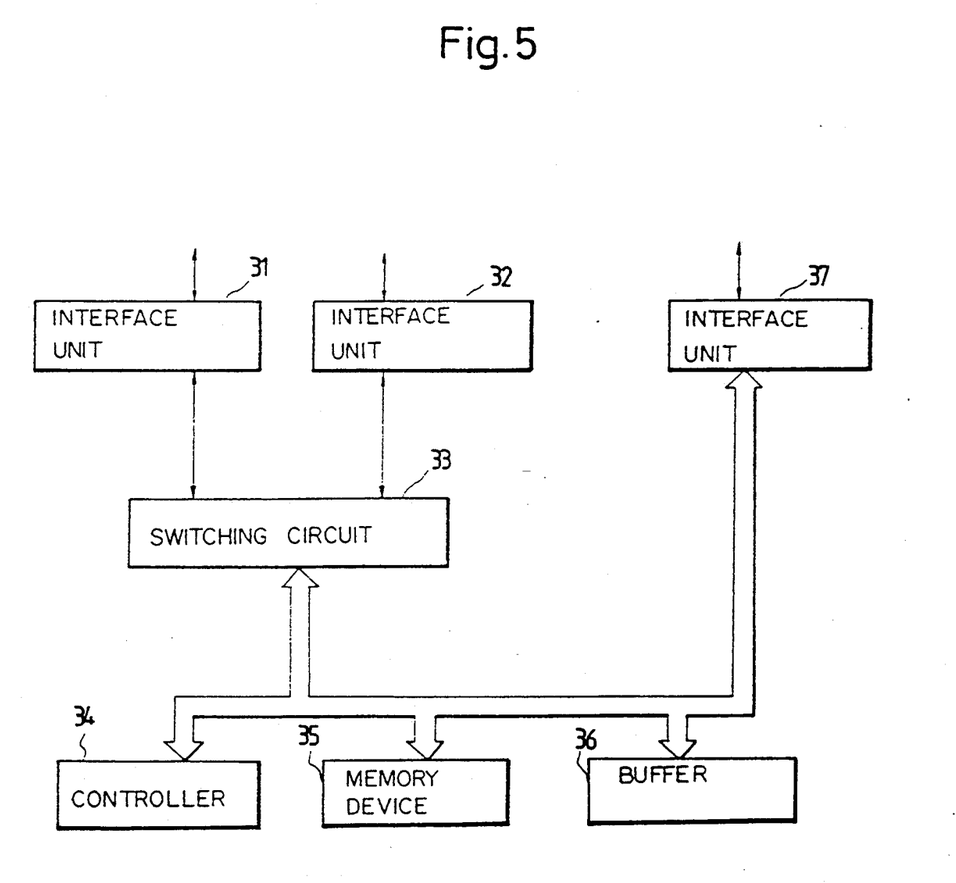
FIG. 5 is a construction diagram of the connecting device.

FIG. 5 is a construction diagram of the connecting device, and in FIG. 5, the reference number 31 shows a sending device interface unit, 32 a receiving device interface unit, 33 a switching circuit, 34 a controller, 35 a memory device, 36 a buffer, and 37 a computer interface unit, respectively.

The sending device interface unit 31 is used as the path inputting and outputting encoded image information and control signals to and from the sending device of the facsimile, and the receiving device interface unit 32 is used as the path inputting and outputting encoded image information and control signals to and from the receiving device.

The switching circuit 33 switches selectively the sending device interface unit 31 or the receiving device interface unit 32, and decides the input and output direction of the image information.

The controller 34, the memory device 35, and the buffer 36 store temporarily a document information inputted through the computer interface unit 37, change the information into an image information, and encode the image information to transmit that through the sending device 1. And also the parts 34, 35 and 36 store temporarily the image information transmitted from the sending device 1 or the receiving device 2, and transmits the image information to the computer 4 through the computer interface unit 37. In this embodiment, the controller 34 is composed of a microprocessor, and the memory device 35 is composed of ROM for storing font data and ROM for storing a program. The computer interface unit 37 performs an interface function for RS232C communication with the computer 4.

In case that the encoded image information and the document information are inputted, the document information is changed into the image information by the controller 34, the memory device 35, and the buffer 36, and the image information is encoded, and then the encoded image information is outputted to the sending device interface unit 31 or the receiving device interface unit 32 according to the selection of the switching circuit 33.

In case that the image information is transmitted into the computer 4 from the sending device 1 or the receiving device 2, the image information inputted from the interface units 31 and 32 is outputted to the computer 37 according to the controlling signals. And also in case that the image information is directly transmitted from the sending device 1 to the receiving device 2, the switching circuit 33 is controlled according to the control signals, and then the image information inputted from the sending device interface unit 31 is directly outputted to the receiving device interface unit 32.

Figure 6:
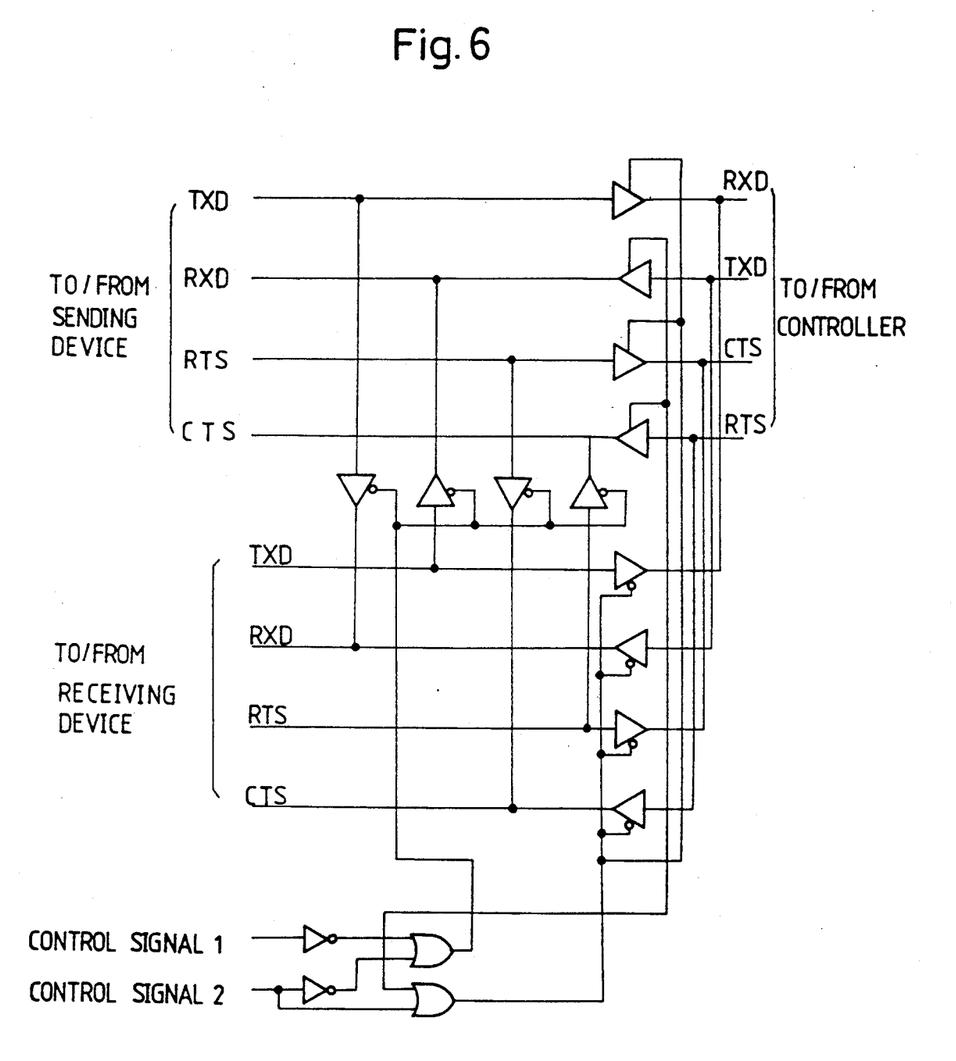
FIG. 6 is a construction diagram of the sending device interface unit, the receiving device interface unit, and the switching circuit.

FIG. 6 is a construction diagram of the sending device interface unit 31, the receiving device interface unit 32, and the switching circuit 33. As shown in FIG. 6, the sending device interface unit 31, the receiving device interface unit 32, and the controller connecting part are respectively composed of four lines transmitting four signals, that is, Request To Send signal (RTS), (CTS), Transmitting Data (TXD), and Receiving Data (RXD), and each signal line is connected each other through the bus buffers. The bus buffers performs the switching function according to the control signal lines 1 and 2 as shown in the following table 1.

<TABLE 1>

| control signal | | DATA DIRECTION |
|---|---|---|
| 1 | 2 | |
| L | L | SENDING DEVICE ←→ CONTROLLER |
| L | H | RECEIVING DEVICE ←→ CONTROLLER |
| H | L | SENDING DEVICE ←→ CONTROLLER |
| H | H | SENDING DEVICE ←→ RECEIVING DEVICE |

Figure 7:
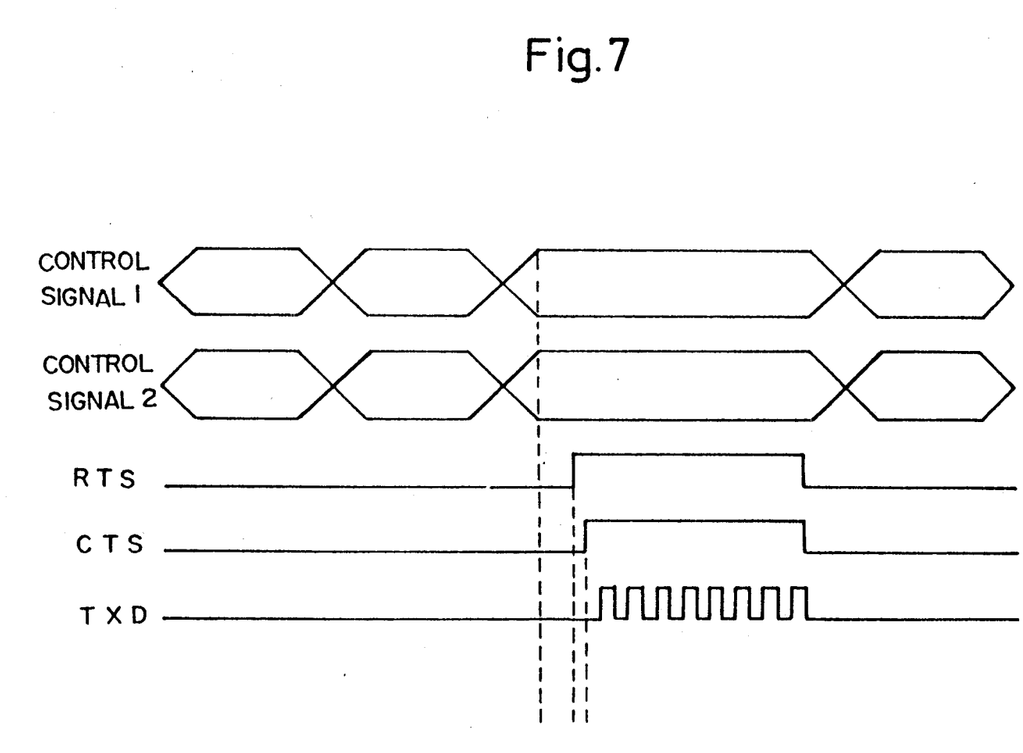
FIG. 7 is a timing diagram of each operation signal shown in FIG. 6.

FIG. 7 is a timing diagram of each operation signal shown in FIG. 6, and is to show the case that transmits data from the sending device 1 or the receiving device 2 to the connecting device 3.

The switching circuit 33 within the connecting device 3 switches periodically the sending device interface unit 31 or the receiving device interface unit 32, and at this time, monitors periodically that the Request To Send (RTS) signal is in active state (H). If RTS signal is in active state (H), it makes the Command To Send (CTS) signal active. At this time, the sending device 1 or the receiving device 2 transmits the sending data according to the inputted CTS signal. In case that the transmission of the sending data is completed, it makes RTS signal inactive, switches periodically the control signals, and monitors RTS signal. Said procedure is applied also in case that transmits data from the connecting device 3 to the sending device 1 or the receiving device 2.

FIG. 8A through FIG. 8D are block diagrams for showing various applications of the invention, and in the drawings, the reference number 7 shows the telephone set.

Figure 8A:
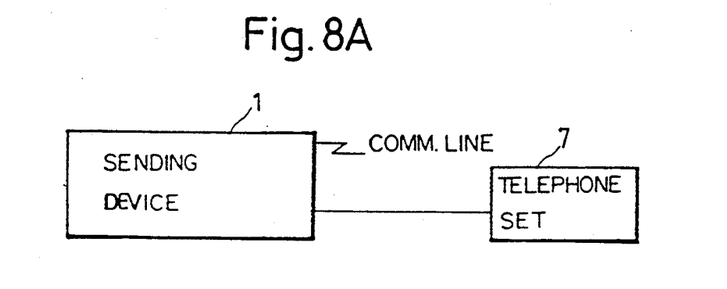
FIG. 8A to FIG. 8D are block diagrams for showing various applications of the invention.
Figure 8B:
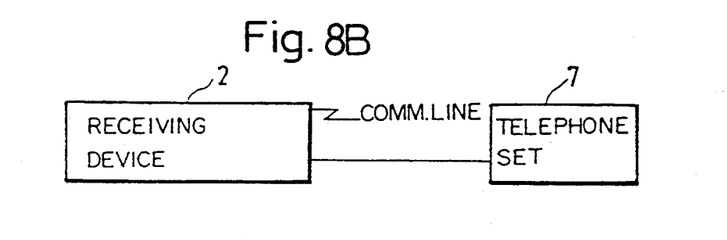

FIG. 8A is to show use of just the sending device in the facsimile transmission, FIG. 8B is to show use of just the receiving device.

Figure 8C:
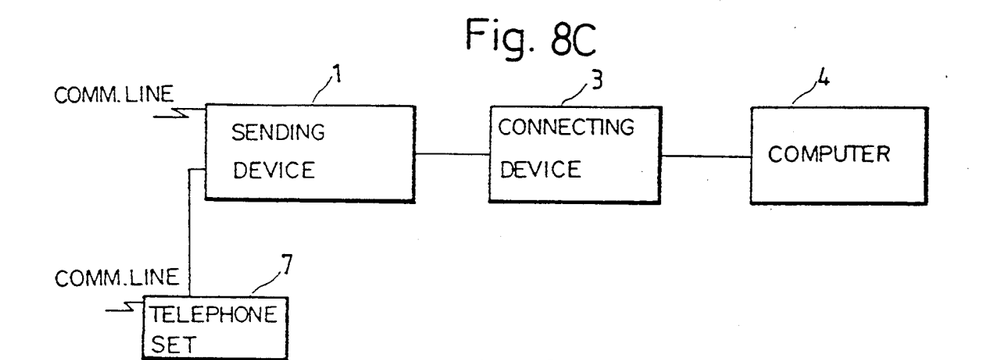

FIG. 8C is to show an example uses as the computer sending device and as the image input device, and this system reads an image at the sending device 1, and transmits that to the other device or transmits the image stored in the computer 4. And also this system stores the image read from the sending device 1 in the computer 4.

Figure 8D:
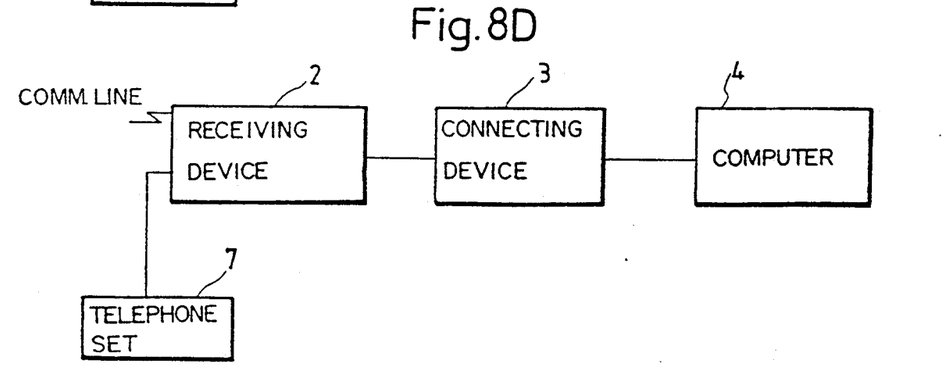

FIG. 8D is show an example used as the receiving device and the recording device of the computer 4, and this system records the image information sent from the other party's facsimile device in the receiving device and stores that in the computer 4, or records in the receiving device 2 the data stored within the computer 4.

What is claimed is:

1. A modular computer-facsimile system comprising a modular sending device, a modular receiving device, and a connecting device:
   (a) said modular sending device comprising:
      an image input unit for scanning an original document and converting the document into image data;
      an image processor compressing and encoding the image data inputted from the image input unit;
      sending device control and selection means comprising a CPU (Central Processing Unit) chip connected to the image input unit and the image processor;
      a modulator connected to the control and selection means, for modulating the encoded image data to produce a modulated signal;
      a network control unit connected to the modulator, for outputting the modulated signal to a remote facsimile through a communication line; and
      a sending interface unit connected to the sending device control and selection means, for transmitting the encoded image data to said connecting device or said receiving device, said sending control and selection means deciding to send the encoded image data to either said modulator or said sending interface unit;
   (b) said modular receiving device comprising:
      recording means;
      a data processor for regenerating the encoded image data into image data for recording;
      receiving device control and selection means comprising a CPU chip connected to the recording means and the data processor, for deciding to receive the encoded image data from either a demodulator or a receiving interface unit,
      the receiving interface unit connected to the receiving device control and selection means, for receiving the encoded image data from the connecting device or the sending device;
      a demodulator connected to the receiving device control and selection means, for demodulating the modulated signal for the encoded image data through the communication line from a remote facsimile device; and
   (c) said connecting device detachably connected to the sending device and the receiving device, comprising:
      a sending device interface unit connected to the sending interface unit of the sending device for forming a first data path;
      a receiving device interface unit connected to the receiving interface unit of the receiving device for forming a second data path;
      a switching circuit connected to the sending device interface unit and the receiving device interface unit, for switching selectively between the data paths according to a control signal;
      a controller connected to the switching circuit;
      memory means connected to the switching circuit;
      buffer means connected to the switching circuit; and
      a computer interface unit connected to the controller, the memory means and the buffer means, for transmitting the encoded image data to and from a computer;
      wherein the sending device interface unit, the receiving device interface unit, and the switching circuit comprise a first bus buffer connected to a first four signal lines and a second four signal lines, a second bus buffer connected to the second four signal lines and a third signal lines, and a third bus buffer connected to the first four signal lines and the third four signal lines.

2. A modular computer-facsimile system comprising a modular sending device, a modular receiving device, and a connecting device:
   (a) said modular sending device comprising;
      an image input unit for scanning an original document and converting the document into image data;
      an image processor for compressing and encoding the image data inputted from the image input unit;
      sending device control and selection means comprising a CPU (Central Processing Unit) chip connected to the image input unit and the image processor;
      a modulator connected to the control and selection means, for modulating the encoded image data to produce a modulated signal;
      a network control unit connected to the modulator, for outputting the modulated signal to a remote facsimile through a communication line; and
      a sending interface unit connected to the sending device control and selection means, for transmitting the encoded image data to said connecting device or said receiving device, said sending control and selection means deciding to send the encoded image data to either said modulator or said sending interface unit;
   (b) said modular receiving device comprising:
      recording means;
      a data processor for regenerating the encoded image data into image data for recording;

receiving device control and selection means comprising a CPU chip connected to the recording means and the data processor, for deciding to receive the encoded image data from either a demodulator or a receiving interface unit;

the receiving interface unit connected to the receiving device control and selection means, for receiving the encoded image data from the connecting device or the sending device;

a demodulator connected to the receiving device control and selection means, for demodulating the modulated signal for the encoded image data through the communication line from a remote facsimile device; and (c) said connecting device detachably connected to the sending device and the receiving device, comprising:

a sending device interface unit connected to the sending interface unit of the sending device for forming a first data path;

a receiving device interface unit connected to the receiving interface unit of the receiving device for forming a second data path;

a switching circuit connected to the sending device interface unit and the receiving device interface unit, for switching selectively between the data paths according to a control signal;

a controller connected to the switching circuit;

memory means connected to the switching circuit;

buffer means connected to the switching circuit; and a computer interface unit connected to the controller, the memory means and the buffer means, for transmitting the encoded image data to and from a computer;

wherein the receiving device control and selection means selectively decides whether to send the received image data to the recording means for printing or to the computer for storing according to a status of the computer.

* * * * *